US007640559B2

(12) United States Patent
Wakabayashi et al.

(10) Patent No.: US 7,640,559 B2
(45) Date of Patent: Dec. 29, 2009

(54) OBJECTIVE LENS ACTUATOR

(75) Inventors: Kanji Wakabayashi, Kyoto (JP);
Yoshiaki Komma, Osaka (JP); Kousei Sano, Osaka (JP); Hidenori Wada, Kyoto (JP); Keiichi Matsuzaki, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 556 days.

(21) Appl. No.: 11/643,770

(22) Filed: Dec. 22, 2006

(65) Prior Publication Data
US 2008/0031120 A1 Feb. 7, 2008

(30) Foreign Application Priority Data
Dec. 27, 2005 (JP) ............................. 2005-375228

(51) Int. Cl.
*G11B 7/00* (2006.01)
(52) U.S. Cl. ............... 720/671; 369/44.11; 369/112.24; 720/669; 720/672
(58) Field of Classification Search ........................ None
See application file for complete search history.

(56) References Cited

U.S. PATENT DOCUMENTS

| 7,289,417 | B2 * | 10/2007 | Kim et al. | ............... | 369/112.24 |
| 7,458,086 | B2 * | 11/2008 | Kim et al. | ............... | 720/672 |
| 2005/0047313 | A1 * | 3/2005 | Saitoh et al. | ............ | 369/112.05 |
| 2007/0064551 | A1 | 3/2007 | Mizuno et al. | | |

FOREIGN PATENT DOCUMENTS

| JP | 9-297927 | 11/1997 |
| JP | 2004-310970 | 11/2004 |
| JP | 2005-302163 | 10/2005 |
| WO | 2005/055214 | 6/2005 |

OTHER PUBLICATIONS

Written Opinion of the International Searching Authority issued *Feb. 5, 2008* in the International (PCT) Application No. PCT/JP2006/325636.

* cited by examiner

*Primary Examiner*—Joseph H Feild
*Assistant Examiner*—Tawfik Goma
(74) *Attorney, Agent, or Firm*—Wenderoth, Lind & Ponack, L.L.P.

(57) ABSTRACT

An objective lens actuator is provided which includes two objective lenses mounted on a movable body, and which is capable of preventing the movable body from coming into contact or collision with a disk and whose thickness becomes thinner. When a light beam is concentrated and focused on a high-density optical disk, D1 represents the distance between the disk surface and the part of the movable body in the closest position to the disk; when a light beam is concentrated and focused on a CD, D2 represents the distance between the disk surface and the part of the movable body in the closest position to the disk; when a light beam is concentrated and focused on a DVD, D3 represents the distance between the disk surface and the part of the movable body in the closest position to the disk; and the following relational expression (1) is satisfied, $$D1 < D2 < D3 \qquad (1).$$

10 Claims, 8 Drawing Sheets

FIG. 7
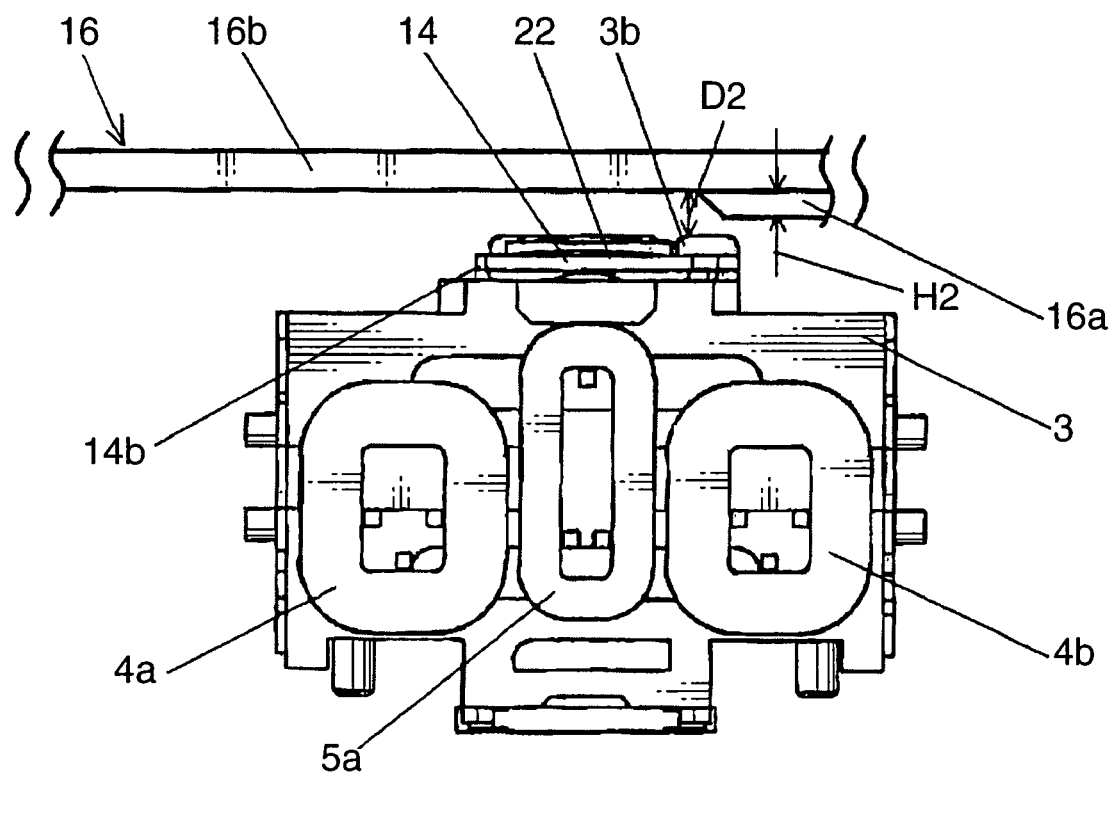
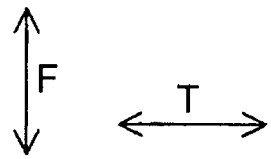

OBJECTIVE LENS ACTUATOR

BACKGROUND OF THE INVENTION

1. Field of the Invention

The present invention relates to an objective lens actuator which is mounted on an optical head of an optical disk unit that regenerates information from an information recording medium typified by an optical disk or records information in such a recording medium, and which drives an objective lens.

2. Description of the Background Art

A digital versatile disk (or DVD) can record digital information with a recording density approximately six times as high as a compact disk (or CD). Hence, it is known as an optical disk which can record large-capacity data. In recent years, the amount of information to be recorded in an optical disk has increased, thus seeking for an optical disk with a larger capacity. In order to make the capacity of an optical disk larger, when information is recorded in an optical disk and when the information recorded in the optical disk is regenerated, the light spot formed by a beam of light applied to the optical disk needs making smaller so that the recording density of information becomes higher. If the wavelength of a laser beam from a light source is shortened and the numerical aperture (or NA) of an objective lens is wider, then the light spot becomes smaller. In a DVD, there are used a light source which emits a laser beam with a wavelength of 660 nm and an objective lens which has a numerical aperture (or NA) of 0.6. For example, if a laser which emits a bluish-violet laser beam with a wavelength of 405 nm and an objective lens which has an NA of 0.85, then the recording density becomes five times as high as that of the DVD.

There is an optical disk unit which realizes a high-density recording and regeneration, using a short-wavelength laser beam of a bluish-violet laser. If it has the function of being compatible with an existing optical disk, it becomes more useful as the unit, thus improving its cost performance. In this case, it is difficult to make the working distance as long as that of an objective lens for a DVD or a CD, at the same time that the numerical aperture of an objective lens is widened to 0.85. Hence, in a compatible-type optical disk unit which can execute a recording and a regeneration with a high density, at least one objective lens used for the recording and regeneration of a CD or a DVD and an objective lens for a high-density recording which has a greater numerical aperture than this need to be individually provided.

On the other hand, in an objective lens actuator for an optical disk unit, a magnetic circuit is formed so that it can be driven both in the focusing direction and in the tracking direction. This magnetic circuit has the function of keeping the distance unchanged between an optical disk and an objective lens in the focusing direction and moving the objective lens to a desirable track position in the tracking direction. However, as described above, in an optical disk unit where a plurality of optical disks having a recording density different from each other are compatible, the plurality of optical disks with a mutually-different recording density require their corresponding objective lenses, respectively. Hence, the objective lens actuator has to be configured so that a plurality of objective lenses are mounted on a movable portion and are movable in the focusing direction and in the tracking direction.

In the case where a recording or a regeneration is executed for a plurality of optical disks with a mutually-different recording density, the working distance of each objective lens varies according to the recording density. Thus, the position of a movable portion differs with kept in focus. A prior art discloses that a plurality of objective lenses are mounted on a movable portion, three optical disks have a recording density different from each other, and their positional relations are given with kept in focus. As the prior art, there is the following unit (refer to Japanese Patent Laid-Open No. 2005-302163 specification).

In Japanese Patent Laid-Open No. 2005-302163, on a movable portion are mounted a first objective lens which concentrates a light beam on the recording surface of a Blu-ray disk (or BD) and a second objective lens which concentrates a light beam on the recording surface of a CD or a DVD. The neutral position of a movable block in the focusing direction when an information signal is recorded in or regenerated from the BD is set between the neutral position of the movable block in the focusing direction when an information signal is recorded in or regenerated from the CD and the neutral position of the movable block in the focusing direction when an information signal is recorded in or regenerated from the DVD.

In an objective lens actuator which has the above described configuration according to the prior art, the position of the movable portion with focused on the CD is set in a position closer to the disk than the position of the movable portion with focused on the BD is. In terms of the BD, generally, the numerical aperture (or NA) is wide at about 0.85. Hence, the working distance (or WD) is set at around 0.2 to 0.4 mm, and thus, it is extremely short. On the other hand, in the CD, a rib called a stack rib is formed on the inside of its innermost circumferential data area. Particularly, in a CD-R or a CD-RW, the height of a stack rib is standardized at the maximum 0.4 mm. Thus, if the position of the movable portion with focused on the CD is set in a position closer to the disk than the position of the movable portion with focused on the BD is, then at the time of a recording and a regeneration in the CD, the distance from the disk's surface up to the part of the movable portion which is closest to the disk becomes at least 0.2 to 0.4 mm, or below. In this positional relation, therefore, the stack rib and the movable portion may contact or collide. This raises a disadvantage in that the movable portion comes into contact or collision with the CD, thus making the focusing impossible and hindering the recording and the regeneration in the CD.

In addition, the surface sway of a BD and a DVD is permitted to be 0.3 mm at the maximum in their standard, while the surface sway of a CD is permitted to be 0.5 mm at the maximum. Hence, the movement range necessary for the focusing of the movable portion becomes widest when a recording or a regeneration is executed in the CD. Therefore, among the focusing-operation positions for those three kinds of disks, the focusing-operation position for the CD whose necessary movement range becomes the maximum is supposed to be set in the closest position to the disk. In that case, the total movement range necessary for the three kinds of disks becomes wider as the section where the three movement ranges overlap each other is reduced. This makes it difficult to thin an objective lens actuator.

SUMMARY OF THE INVENTION

In order to resolve the above described disadvantages, it is an object of the present invention to provide an objective lens actuator which includes two objective lenses mounted on a movable portion, aiming at realizing a compatible-type optical disk unit which can execute a recording and a regeneration for a plurality of optical disks whose recording densities are different from each other, and which is capable of preventing the movable portion from coming into contact or collision with a disk and making the unit thinner.

In order to resolve the above described disadvantages, an objective lens actuator according to the present invention, which is mounted on an optical head that concentrates a light beam on an optical disk, comprising: a movable body which includes a first objective lens used for concentrating the light beam on a recording surface of a high-density optical disk having a recording density higher than a DVD, a second objective lens used for concentrating the light beam on a recording surface of a CD or a DVD, and a lens holder holding both objective lenses; a base; and a support member supporting the movable body on the base so that the movable body moves in the focusing direction and in the tracking direction, wherein: when a light beam is concentrated and focused on the high-density optical disk, D1 represents the distance between the disk surface and the part of the movable body in the closest position to the disk; when a light beam is concentrated and focused on the CD, D2 represents the distance between the disk surface and the part of the movable body in the closest position to the disk; when a light beam is concentrated and focused on the DVD, D3 represents the distance between the disk surface and the part of the movable body in the closest position to the disk; and the following relational expression (1) is satisfied, $$D1 < D2 < D3 \quad (1).$$

In addition, an objective lens actuator according to the present invention, which is mounted on an optical head that concentrates a light beam on an optical disk, comprising: a movable body which includes a first objective lens used for concentrating the light beam on a recording surface of a first high-density optical disk having a base-material thickness of substantially 0.1 mm and a recording density higher than a DVD, using a bluish-violet laser, a second objective lens used for concentrating the light beam on a recording surface of a CD, a recording surface of a DVD or a recording surface of a second high-density optical disk having a base-material thickness of substantially 0.6 mm and a recording density higher than a DVD, using a bluish-violet laser, and a lens holder holding both objective lenses; a base; and a support member supporting the movable body on the base so that the movable body moves in the focusing direction and in the tracking direction, wherein: when a light beam is concentrated and focused on the first high-density optical disk, D1 represents the distance between the disk surface and the part of the movable body in the closest position to the disk; when a light beam is concentrated and focused on the CD, D2 represents the distance between the disk surface and the part of the movable body in the closest position to the disk; when a light beam is concentrated and focused on the DVD, D3 represents the distance between the disk surface and the part of the movable body in the closest position to the disk; when a light beam is concentrated and focused on the second high-density optical disk, D4 represents the distance between the disk surface and the part of the movable body in the closest position to the disk; and the following relational expression (2) is satisfied, $$D1 < D2 < D3 \approx D4 \quad (2).$$

BRIEF DESCRIPTION OF THE DRAWINGS

FIG. 7 is an illustration, showing the relation between the position of the movable portion and the position of a stack rib with respect to the CD, with kept in focus.

DETAILED DESCRIPTION OF THE PREFERRED EMBODIMENT OF THE INVENTION

Hereinafter, the best mode for embodying the present invention will be described in detail with reference to the attached drawings.

First Embodiment

Figure 1:
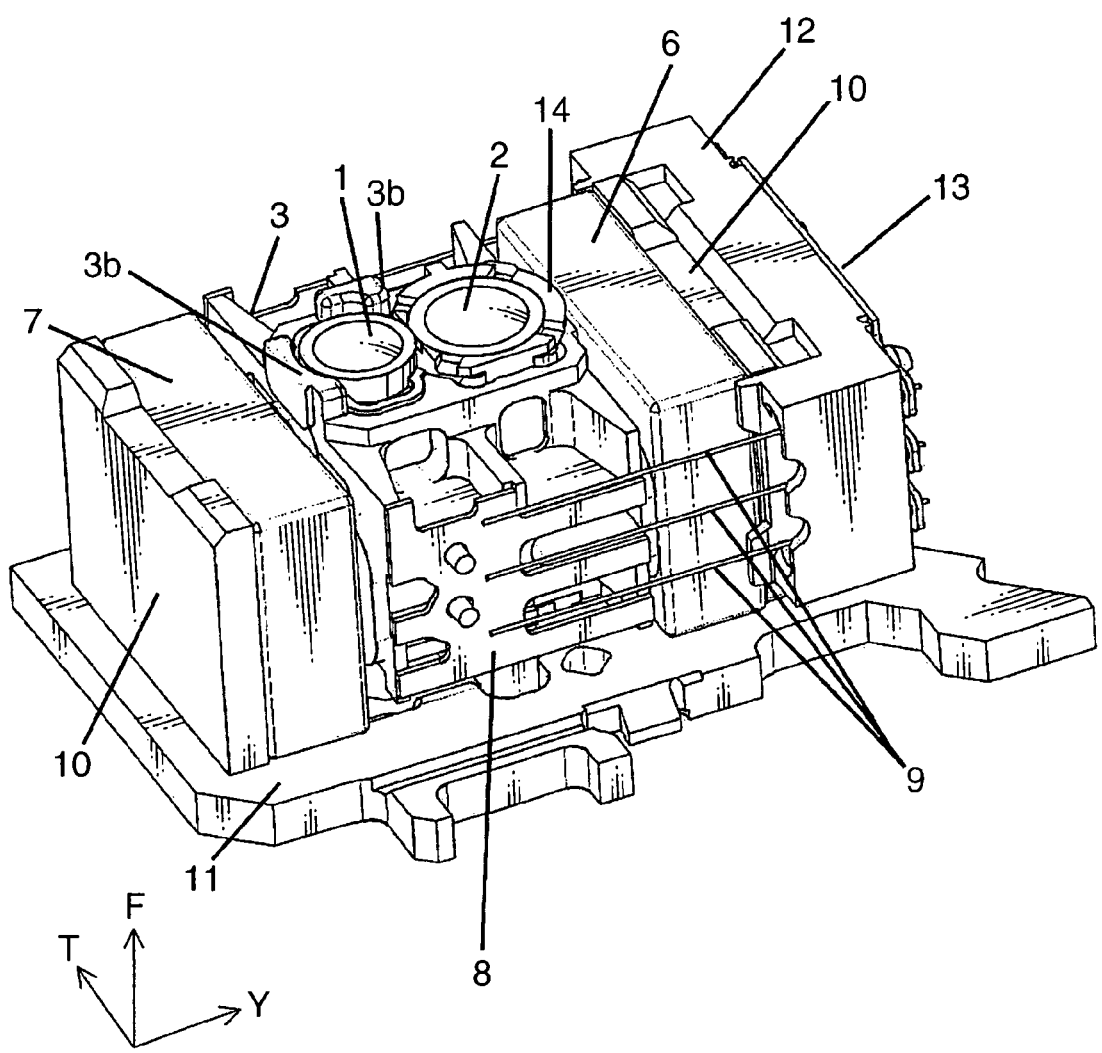
FIG. 1 is a perspective view of an objective lens actuator according to a first embodiment of the present invention.
Figure 2:
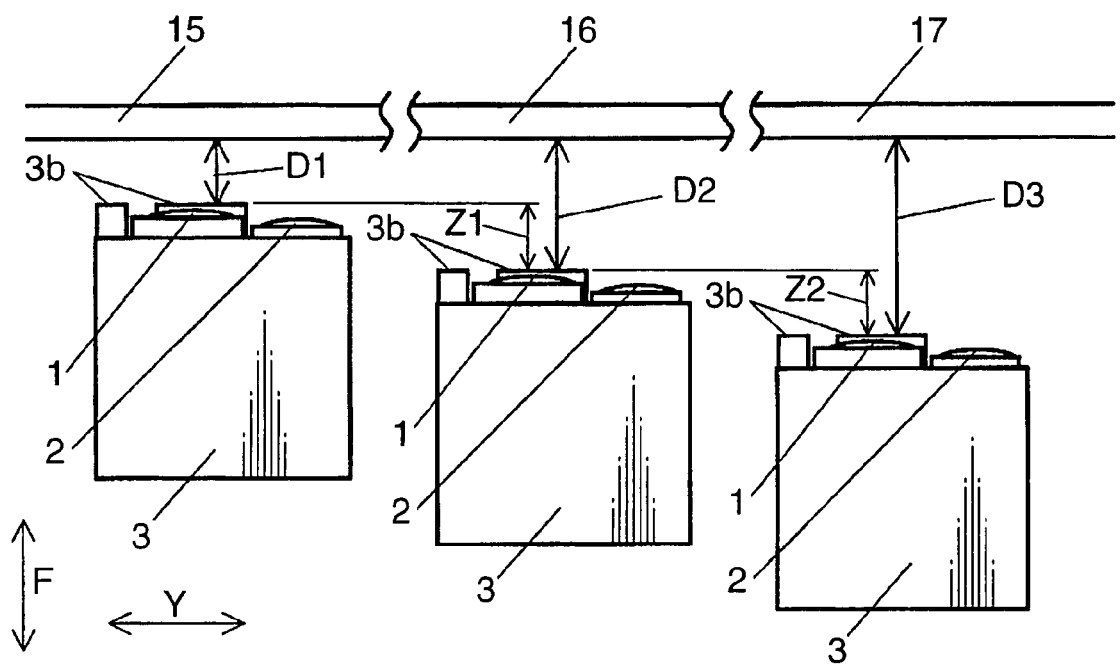
FIG. 2A is an illustration, showing the position of a movable portion with respect to a BD, with kept in focus.
FIG. 2B is an illustration, showing the position of the movable portion with respect to a CD, with kept in focus.
FIG. 2C is an illustration, showing the position of the movable portion with respect to a DVD, with kept in focus.
Figure 3:
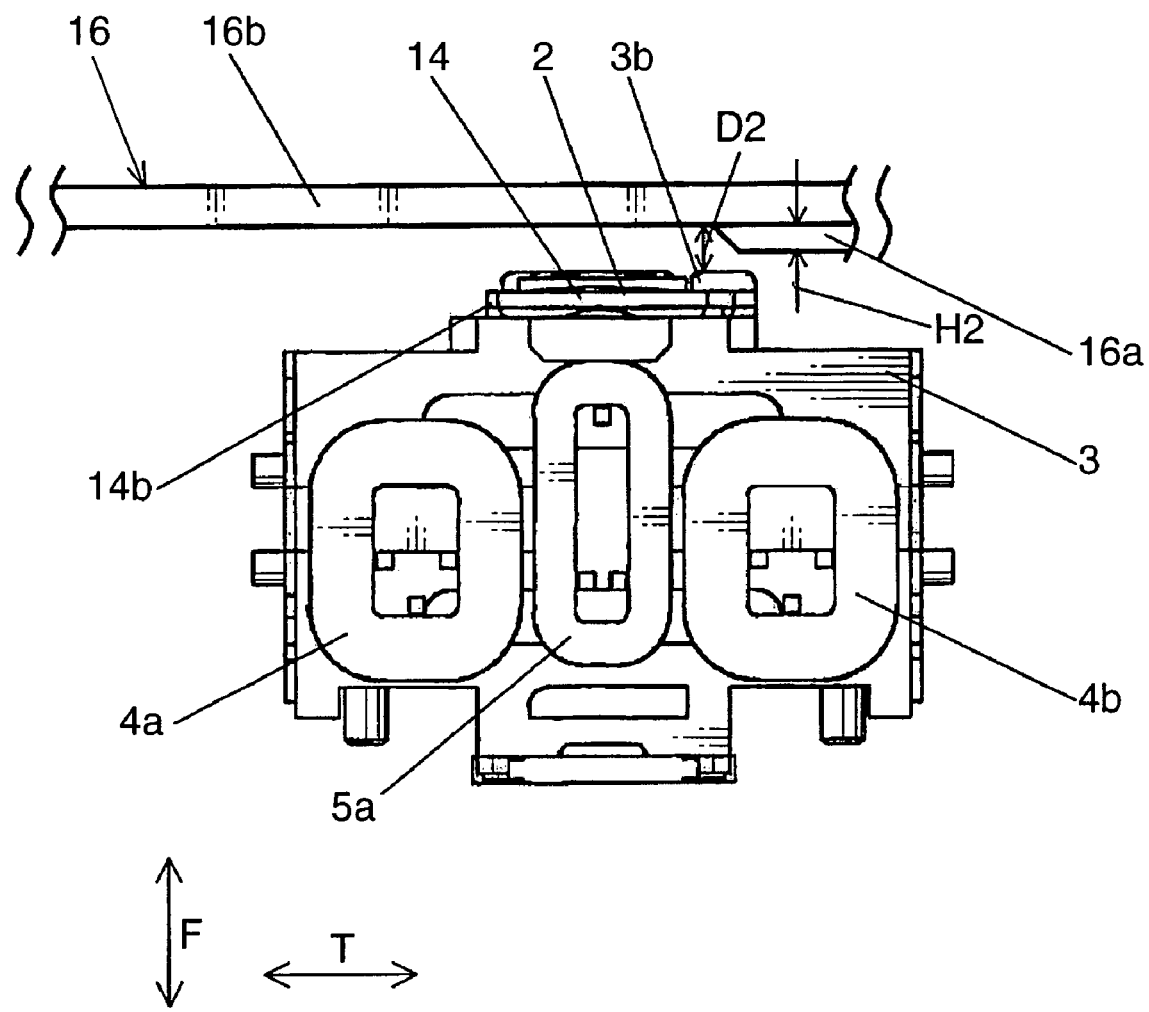
FIG. 3 is an illustration, showing the relation between the position of the movable portion and the position of a stack rib with respect to the CD, with kept in focus.
Figure 4:
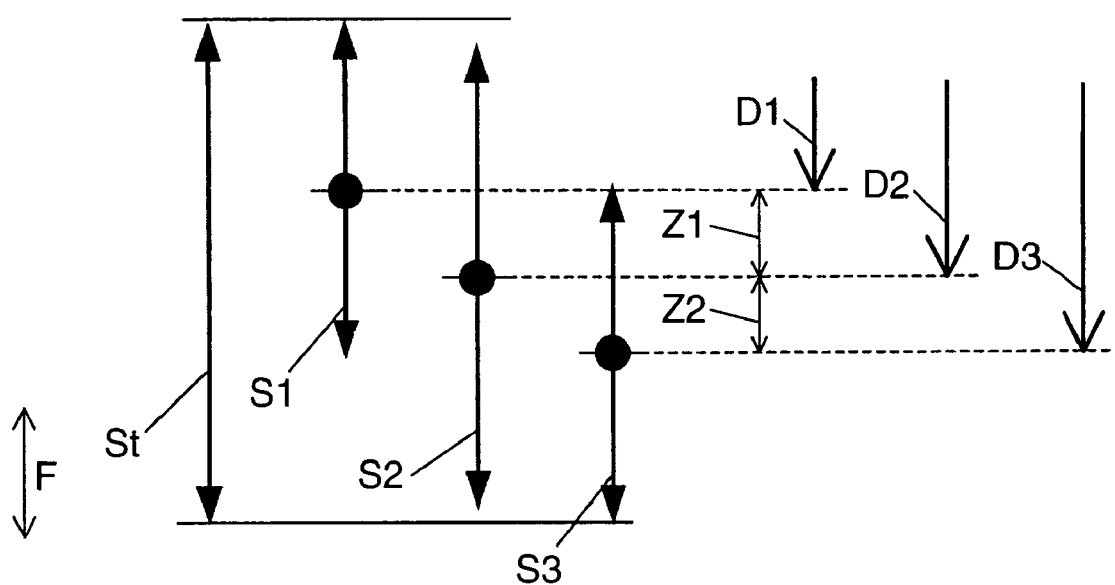
FIG. 4 is an illustration, schematically showing movement ranges for the BD, the CD and the DVD.

FIG. 1 is a perspective view of an objective lens actuator according to a first embodiment of the present invention. FIGS. 2A to 2C are each an illustration, schematically showing the position of a movable portion with respect to a BD, a DVD or a CD, respectively, in a focusing-operation state in the objective lens actuator according to the first embodiment. FIG. 3 is an illustration, schematically showing the positional relation between the movable portion and a stack rib with respect to the CD, in the focusing-operation state. FIG. 4 is an illustration, showing movement ranges for the BD, the DVD and the CD.

In FIG. 1, an arrow F indicates the focusing direction; an arrow T, the tracking direction; and an arrow Y, the tangential direction of an optical disk (not shown). These focusing direction F, tracking direction T and tangential direction Y are perpendicular to each other. Each of the directions corresponds to the direction of each coordinate axis in three-dimensional orthogonal coordinates.

The objective lens actuator according to the first embodiment includes a lens holder 3 formed by a molded resin. On this lens holder 3, there are mounted an objective lens 2 used for executing a recording and a regeneration in a CD-type or DVD-type optical disk, and an objective lens 1 used for executing a recording and a regeneration, using a bluish-violet semiconductor laser, in a high-density optical disk such as a Blu-ray disk (or BD) which has a base-material thickness of substantially 0.1 mm and a higher density than that of the DVD-type optical disk. The objective lens 1 and the objective lens 2 are disposed so as to be adjacent to each other in the tangential directions Y.

To the lens holder 3 are attached a focusing coil as a focusing-direction drive portion which gives the movable portion (described later) a driving force in the focusing direction, and a focusing coil as a tracking-direction drive portion which gives the movable portion a driving force in the tracking direction. Four focusing coils are provided, but in FIG. 3, only two are shown, which are given reference numerals and characters 4a and 4b. The focusing coils 4a and 4b are placed side by side in the tracking directions. The other two are disposed on the reverse side in FIG. 3 and are opposite to the focusing coils 4a and 4b, respectively, in the tangential directions Y. On the other hand, two tracking coils are provided, but in FIG. 3, only one is shown, and given a reference numeral and character 5a. The tracking coil 5a is disposed between the focusing coils 4a and 4b, and the remaining tracking coil is disposed so as to face this tracking coil 5a in the tangential directions.

The focusing coil 4a and the focusing coil located in the tangential directions Y of this focusing coil 4a connect mutually. Both terminals of them are connected to a terminal board 8 on one side. This terminal board 8 is linked via a wire 9 and a substrate 13 to a control circuit (not shown). On the other hand, the focusing coil 4b and the focusing coil located in the tangential directions Y of this focusing coil 4b connect mutually. They are connected to a terminal board 8 different from the above described terminal board 8. This terminal board 8 is linked via another wire 9 different from the above described wire 9 and the substrate 13 to the above described control circuit. Both terminal boards 8 are apart from each other in the tracking direction T.

The tracking coil 5a and the tracking coil link together in series, and these are linked via the terminal boards 8, the wires 9 and the substrate 13 to the above described control circuit (not shown).

The objective lens actuator includes a base 11. On the base 11 are fixed a yoke 10, a sus-holder 12 and the substrate 13. Two such yokes 10 are provided, and these yokes 10 are placed at an interval in the tangential direction Y.

To the one yoke 10, a first magnet 6 is fixed, and a second magnet 7 is fixed to the other yoke 10. These magnets 6, 7 are both a multi-polar magnet, and the magnets 6, 7 are each divided into a plurality of areas so that they correspond to the focusing coils 4a, 4b and the tracking coil 5a.

In the wire 9, its end part on the base-end side penetrates the sus-holder 12 and is fixed to the substrate 13. The wire 9 is made of an elastic metal material, such as beryllium copper and phosphor bronze. It is formed by a wire material or a rod material whose section is shaped like a circle, substantially a polygon, an ellipse or the like. The front-end part of the wire 9 is fixed to the terminal boards 8. The wire 9 functions as a support member which supports a movable portion (mentioned later) on the base 11 so that it can move in the focusing directions and in the tracking directions. The wire 9's front-end part corresponds to the support center of the movable portion, and this support center is set to substantially coincide with the gravity center of the movable portion. The movable portion is formed by the objective lens 2 for a DVD/CD, the objective lens 1 for a BD, the lens holder 3, the four focusing coils and the two tracking coils.

The objective lens 2 and the objective lens 1 are placed in array on the lens holder 3 along the tangential direction Y. The objective lens 2 is disposed on the wire 9's base-end side with respect to the wire 9's support center. On the other hand, the objective lens 1 is disposed on the wire 9's front-end side with respect to the wire 9's support center.

In the lens holder 3, a spherical concave-surface portion (not shown) is formed at the part where the objective lens 2 is mounted thereon. On the other hand, the objective lens 2 is embedded in a tilting holder 14 which has a spherical convex-surface portion (not shown). Hence, those are designed to be a single unit. Then, the convex-surface portion of the tilting holder 14 is placed on the concave-surface portion of the lens holder 3. Thereby, the spherical concave-surface portion of the lens holder 3 is slid in contact with the spherical convex-surface portion of the tilting holder 14, so that the angle of the objective lens 2 can be independently passed through the objective lens 2 is concentrated on the recording surface of a CD 16, D2 represents the distance between the surface of the CD 16 and the collision avoidance portion 3b of the movable portion with kept in focus.

As shown in FIG. 2C, when the light beam which has passed through the objective lens 2 is concentrated on the recording surface of a DVD 17, D3 represents the distance between the surface of the DVD 17 and the collision avoidance portion 3b of the movable portion with kept in focus.

D1, D2, D3 satisfy the following relational expression (1), $$D1<D2<D3 \tag{1}$$

For example,
D1=0.25 mm
D2=0.54 mm
D3=0.80 mm.

In the objective lens actuator configured as described above, the positional relation between the movable portion and a stack rib with respect to the CD 16 in the focusing-operation state will be described with reference to FIG. 3. In FIG. 3, reference numeral 16 denotes an optical disk formed by a CD-R or a CD-RW. This optical disk includes a disk body 16b shaped like a round plate, and a stack rib 16a formed so as to protrude on this disk body 16b. The stack rib 16a is disposed on the inside close to the recording area provided in the disk body 16b. The height up to which the stack rib 16a protrudes from the disk body 16b is set to be H2.

When the light beam is focused on the recording area of the disk body 16b, the distance D2 between the disk surface and the collision avoidance portion 3b of the movable portion is, for example, 0.54 mm, as described earlier. Even if the height H2 of the stack rib 16a is a standard maximum value of 0.4 mm, then because the distance D2 exceeds it, the stack rib 16a is not supposed to contact or collide with the collision avoidance portion 3b of the movable portion.

Next, when the light beam is concentrated on the BD 15, the DVD 17 or the CD 16, a movement range in the focusing directions necessary for the movable portion will be described with reference to FIG. 4.

In FIG. 4, a range S1 represents the movement range in the focusing directions necessary to the movable portion when a recording or a regeneration is executed in the BD 15; a range S2 represents the movement range in the focusing directions necessary to the movable portion when a recording or a regeneration is executed in the CD 16; and a range S3 represents the movement range in the focusing directions necessary to the movable portion when a recording or a regeneration is executed in the DVD 17. Then, a range St represents the total movement range in the focusing directions necessary to the movable portion. In other words, even when a recording or a regeneration is executed in any optical disk, the part of the movable body in the closest position to the disk moves within this range St. These movement ranges S1, S2, S3, St all represent the ranges where the part of the movable body in the closest position to the disk can move.

Where the centers of the movement ranges S1, S2, S3 should be positioned is determined based on the above described D1, D2, D3, respectively. Specifically, the center position of the movement range S1 for the BD 15 is set to be the distance D1 away from the disk surface of the BD 15.

Then, the center position of the movement range S2 for the CD 16 is set to be the distance D2 away from the disk surface of the CD 16. And, the center position of the movement range S3 for the DVD 17 is set to be the distance D3 away from the disk surface of the DVD 17.

Herein, the movement range of the movable portion necessary to each optical disk is set by estimating the amount of the disk surface deflection and a mechanical error such as an assembly error. Hence, the movement range can be set as given below.

Movement range $S1$=(the unit's mechanical error)+ (the BD 15's surface deflection amount)

Movement range $S2$=(the unit's mechanical error)+ (the CD 16's surface deflection amount)

Movement range $S3$=(the unit's mechanical error)+ (the DVD 17's surface deflection amount)

Herein, in terms of such a mechanical error, since the objective lens actuator is embedded in a singe optical disk unit and a singe optical head unit, which ever optical disk may be used, its value is the same. In contrast, the surface deflection amount varies according to the type of an optical disk. Specifically, the surface deflection amount of the BD 15 and the DVD 17 is permitted to be 0.3 mm at the maximum in their standard, while the surface deflection amount of the CD 16 is permitted to be 0.5 mm at the maximum in its standard. In terms of the CD 16, many are also put on the market whose surface deflection amount are approximately 0.7 mm beyond the standard value. In the case of the CD 16, therefore, it is necessary to estimate a surface deflection amount value greater than that of the BD 15 and the DVD 17. Accordingly, preferably, the required movement range of the movable portion in the focusing directions should be, $S1=S3<S2$.

It is preferable that the movement range of the movable portion for the CD 16 be wider than the movement range for the other two kinds of disks. If the difference between the movement range S2 and the movement ranges S1, S3 is calculated using the above described surface deflection amount, $S2-S1=(1.0\sim1.4)-0.3\times2=0.4\sim0.8$ $S2-S3=(1.0\sim1.4)-0.3\times2=0.4\sim0.8$.

On the other hand, the distance between the center position of the movement range S2 and the center position of the movement range S1 is equal to a difference Z1 between the distance D2 and the distance D3. Then, the distance between the center position of the movement range S2 and the center position of the movement range S3 is equal to a difference Z2 between the distance D3 and the distance D2. Therefore, $Z1=(S2-S1)/2=0.2\sim0.4$ $Z2=(S2-S3)/2=0.2\sim0.4$.

In this case, within the movement range S2, the movement range S1 and the movement range S3 are substantially included, thereby bringing the total movement range St to the minimum. Besides, the value of Z1 can be prevented from being excessively limited, thus maximizing the value of Z1 while meeting the condition for minimizing the movement range St.

In this first embodiment, as shown in FIG. 4, the center position of the movement range for each optical disk is set to satisfy D1<D2<D3. This makes it possible to set the value of D2 above 0.4 mm. As a result, with focused on a CD-R or a CD-RW, the movable portion can be prevented from contacting or colliding with the stack rib.

Furthermore, the center position of the movement range for the CD 16 which has the widest movement range with kept in focus is set in the middle of the center positions of the movement ranges for the three kinds of optical disks. Thereby, the three movement ranges overlap each other in a wider section. This helps restraining the movement range St required in total from being larger.

Therefore, the disadvantage can be resolved in that the movable portion comes into contact or collision with the CD 16, thereby making the focusing impossible so that a recording or a regeneration cannot be executed in the CD 16. This contributes to the realization of a compatible-type optical disk unit which can execute a recording and a regeneration for a plurality of optical disks whose recording densities are different from each other. At the same time, the objective lens actuator becomes thinner, thus helping thin such an optical disk unit.

Moreover, in this embodiment, the values of Z1 and Z2 are set within a range of 0.2 to 0.4 mm. Therefore, the overlapping section of the movement ranges can be practically set in line with the differences in the surface deflection amount. This makes it possible to narrow the total movement range St certainly.

Incidentally, the objective lens actuator may also be used for a regeneration-dedicated unit.

Herein, the summary of the first embodiment will be described below.

(1) As described so far, in this first embodiment, if a high-density optical disk with kept in focus is compared with a CD with kept in focus, the movable body is farther away from the disk when the CD is kept in focus. Therefore, the recording and regeneration capability of the high-density optical disk can be maintained, and simultaneously, when a recording or a regeneration is executed in the CD which has a stack rib, the movable body is less likely to contact or collide with the disk. Besides, the position of the movable body with respect to the CD which has a wide movement range with kept in focus is between the positions of the movable body with respect to the other two disks with kept in focus. This helps widen the overlapping section of these movement ranges. Consequently, the entire movement range can be restrained from being wider, thus making the objective lens actuator thinner.

(2) The movable body includes a collision avoidance portion which has a part in a position closer to the optical disk than the first objective lens and the second objective lens are. When the light beam is concentrated and focused on the high-density optical disk, the distance D1 is the distance from the disk surface up to this part; when the light beam is concentrated and focused on the CD, the distance D2 is the distance from the disk surface up to this part; and when the light beam is concentrated and focused on the DVD, the distance D3 is the distance from the disk surface up to this part. Therefore, even if the disk has come into contact or collision with the collision avoidance portion, the disk can be prevented from contacting or colliding with the first or second objective lens. This makes it possible to keep those objective lenses from being damaged.

(3) The first objective lens has a numerical aperture of 0.85 and has the characteristic of converging a laser beam whose wavelength is 405 nm upon the recording surface of the high-density optical disk.

(4) The distance D2 is longer than 0.4 mm. As a result, in a state where the second objective lens is focused on a CD-R or a CD-RW, the movable body can be effectively prevented from contacting or colliding with the disk.

(5) The difference between the distance D2 and the distance D1 and the difference between the distance D3 and the distance D2 are both 0.2 mm or above and 0.4 mm or below.

The surface deflection allowable standard value of a CD is 0.5 mm while the standard value of a DVD is 0.3 mm. On the other hand, some CDs which are actually put on the market have a surface deflection amount of 0.7 mm. Besides, in terms of the high-density optical disk, its surface deflection amount is probably set at 0.3 mm or below. Hence, in the case where the value of (D2−D1) and the value of (D3−D2) are each set within a range of 0.2 to 0.4 mm, even if the surface deflection amount is different in accordance with the type of a disk, the movable body is to be set in the position determined by taking such a difference into account. Therefore, according to this aspect, the movable body's movement range is set in response to the practical difference in the surface deflection amount. This helps effectively use the overlapping section of the movement range, and thus, effectively reduce the thickness of the objective lens actuator.

Second Embodiment

Hereinafter, an objective lens actuator according to a second embodiment of the present invention will be described in detail with reference to the attached drawings.

Figure 5:
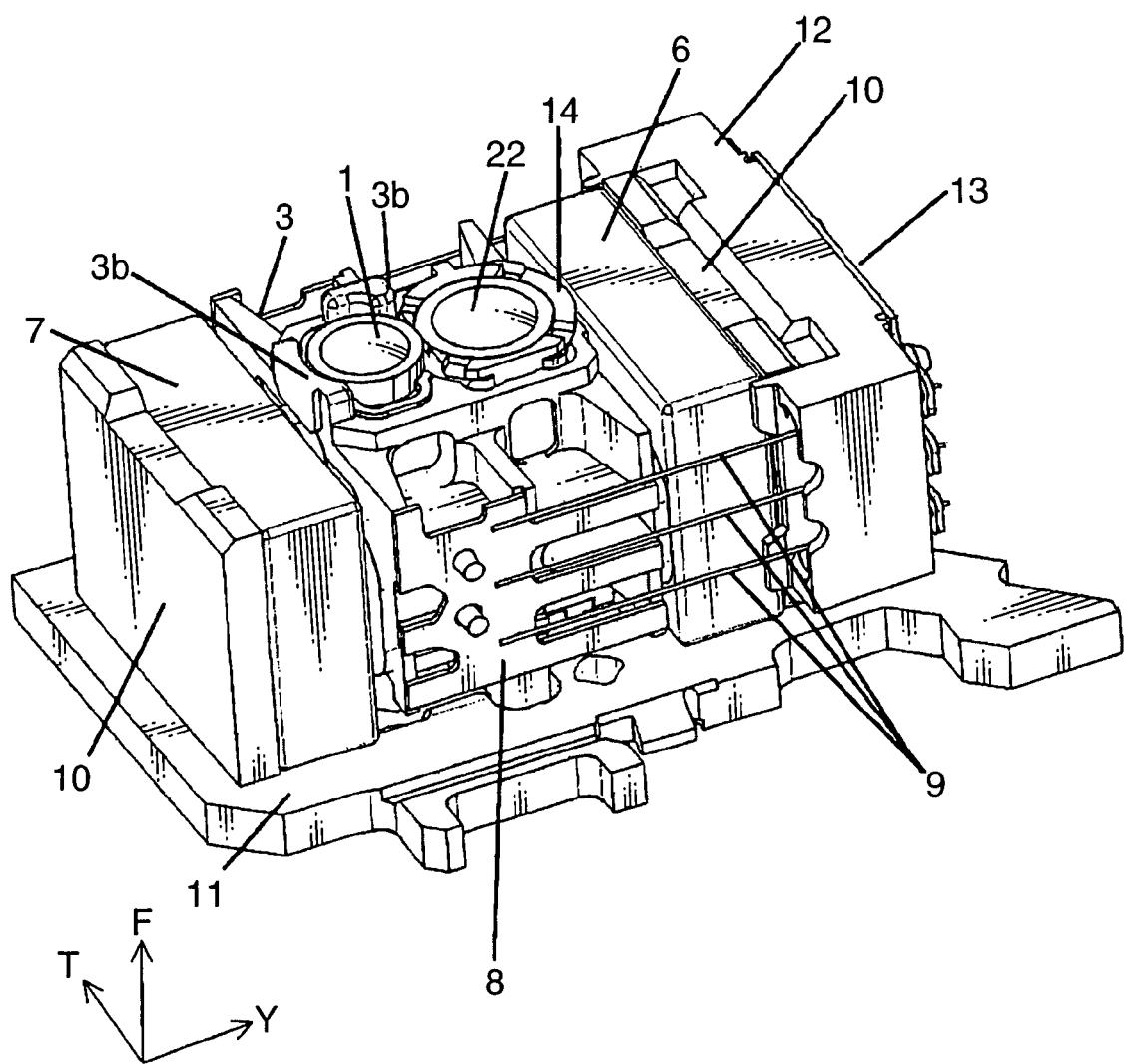
FIG. 5 is a perspective view of an objective lens actuator according to a second embodiment of the present invention.
Figure 8:
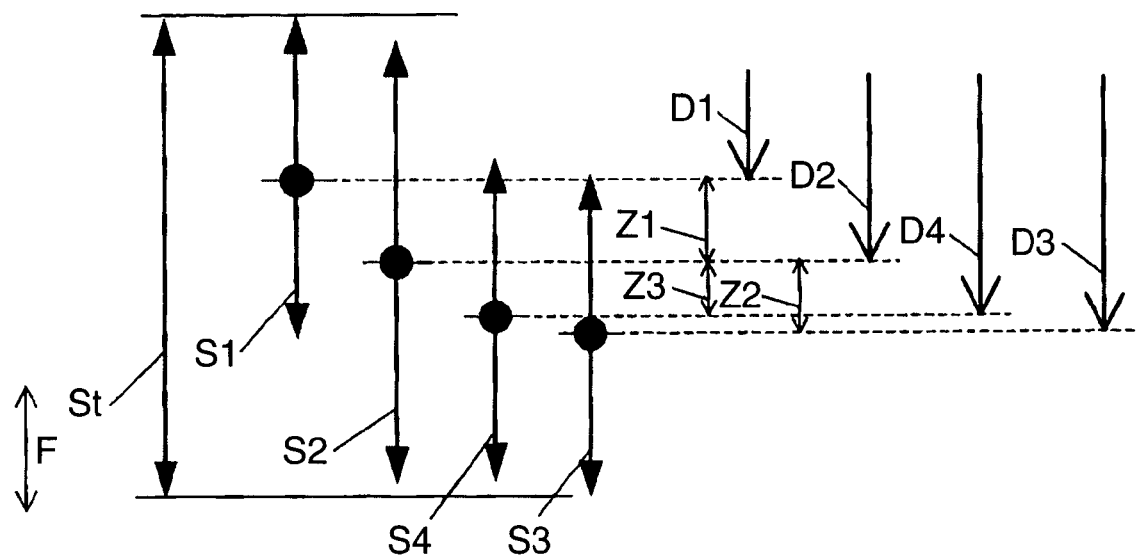
FIG. 8 is an illustration, schematically showing movement ranges for the BD, the CD, the HDDVD and the DVD.

FIG. 5 is a perspective view of the objective lens actuator according to the second embodiment. FIGS. 6A to 6D are each an illustration, schematically showing the position of a movable portion with respect to a BD, a DVD, a CD or an HDDVD, respectively, in a focusing-operation state in the objective lens actuator according to this embodiment. FIG. 7 is an illustration, schematically showing the positional relation between the movable portion and a stack rib with respect to the CD, in the focusing-operation state. FIG. 8 is an illustration, showing movement ranges for the BD, the DVD, the CD and the HDDVD.

Herein, the second high-density optical disk which has a base-material thickness of substantially 0.6 mm and a recording density higher than a DVD is, for example, an HDDVD. The first high-density optical disk is, for example, a BD or the like, and it is a high-density optical disk which has a base-material thickness of substantially 0.1 mm and a recording density higher than a DVD-type optical disk.

FIG. 5 is different from FIG. 1 in the following respects. The objective lens for a DVD/CD is an objective lens 22 which is a second objective lens used for concentrating the light beam, using a bluish-violet laser, upon the recording surface of a CD, the recording surface of a DVD, or the recording surface of the second high-density optical disk which has a base-material thickness of substantially 0.6 mm and a recording density higher than the DVD. Incidentally, the same component elements as those of FIG. 1 are given the identical reference characters and numerals, and thus, their description is omitted.

Next, with reference to FIGS. 6A to 6D, the positional relation of the movable portion with respect to a BD, a DVD, a CD and an HDDVD will be described with kept in focus.

Figure 6:
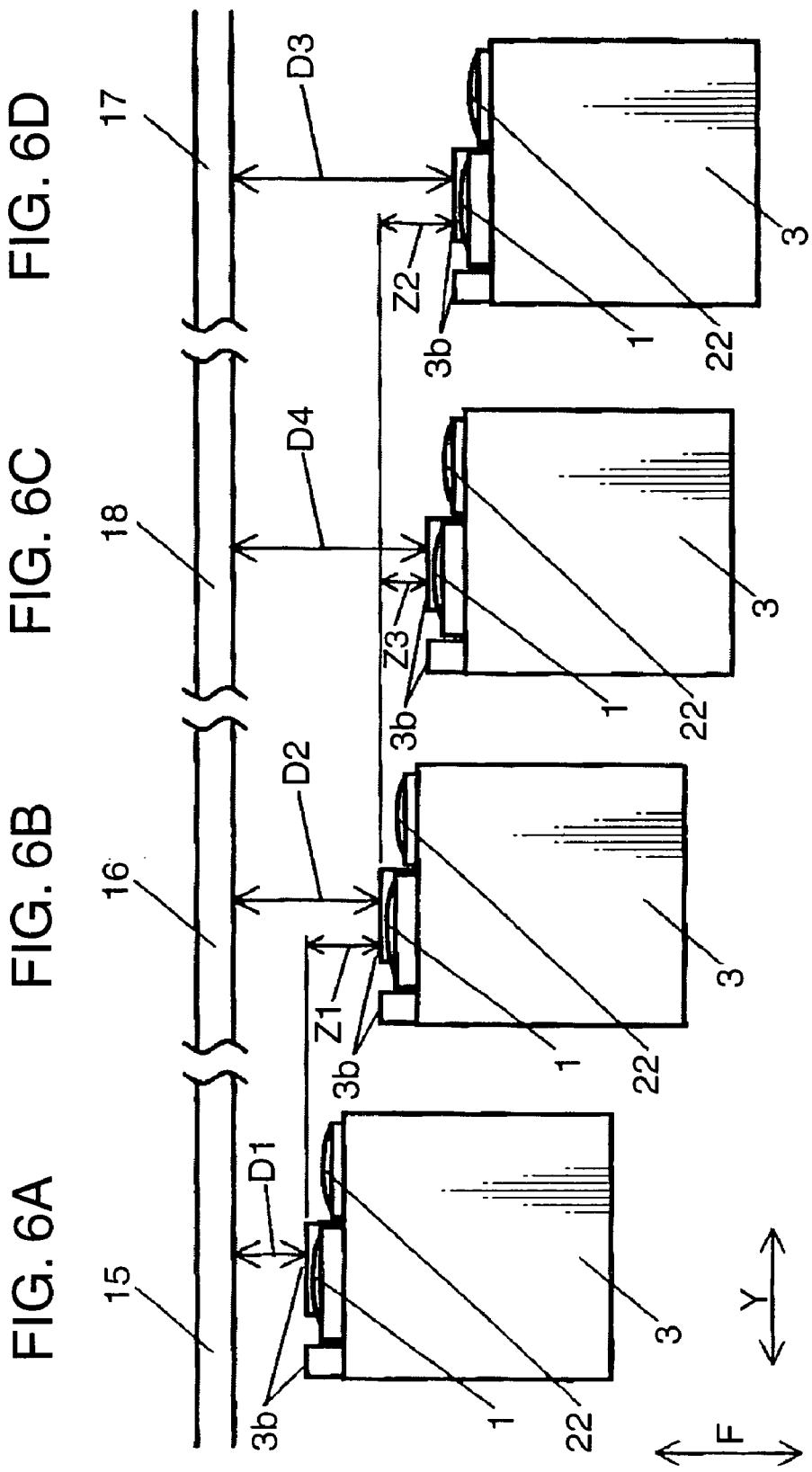
FIG. 6A is an illustration, showing the position of a movable portion with respect to a BD, with kept in focus.
FIG. 6B is an illustration, showing the position of the movable portion with respect to a CD, with kept in focus.
FIG. 6C is an illustration, showing the position of the movable portion with respect to an HDDVD, with kept in focus.
FIG. 6D is an illustration, showing the position of the movable portion with respect to a DVD, with kept in focus.

As shown in FIG. 6A, when the light beam which has passed through the objective lens 1 is concentrated on the recording surface of a BD 15, D1 represents the distance between the surface of the BD 15 and the collision avoidance portion 3b of the movable portion with kept in focus.

As shown in FIG. 6B, when the light beam which has passed through the objective lens 22 is concentrated on the recording surface of a CD 16, D2 represents the distance between the surface of the CD 16 and the collision avoidance portion 3b of the movable portion with kept in focus.

As shown in FIG. 6C, when the light beam which has passed through the objective lens 22 is concentrated on the recording surface of an HDDVD 18, D4 represents the distance between the surface of the HDDVD 18 and the collision avoidance portion 3b of the movable portion with kept in focus.

As shown in FIG. 6D, when the light beam which has passed through the objective lens 22 is concentrated on the recording surface of a DVD 17, D3 represents the distance between the surface of the DVD 17 and the collision avoidance portion 3b of the movable portion with kept in focus.

D1, D2, D3, D4 satisfy the following relational expression (2), $$D1 < D2 < D4 \approx D3 \qquad (2).$$

For example,
D1=0.25 mm
D2=0.54 mm
D3=0.80 mm
D4=0.72 mm.

Herein, if the case where the light beam is concentrated on the DVD 17 is compared with the case where the light beam is concentrated on the HDDVD 18, the former differs from the latter, in the wavelength of the transmitted light beam. However, because both disks have the same base-material thickness and almost the same numerical aperture of 0.65, $D3 \approx D4$.

In the objective lens actuator configured as described above, the positional relation between the movable portion and a stack rib with respect to the CD 16 in the focusing-operation state will be described with reference to FIG. 7. FIG. 7 is different from FIG. 2, in the respect where the objective lens 22 is substituted for the objective lens 2. Herein, the component elements are given the same reference characters and numerals as those of FIG. 1.

In this embodiment alike, when the light beam is focused on the recording area of the disk body 16b, the distance D2 between the disk surface and the collision avoidance portion 3b of the movable portion is, for example, 0.54 mm, as described earlier. Even if the height H2 of the stack rib 16a is a standard maximum value of 0.4 mm, then because the distance D2 exceeds it, the stack rib 16a is not supposed to contact or collide with the collision avoidance portion 3b of the movable portion.

Next, when the light beam is concentrated on the BD 15, the DVD 17, the CD 16 or the HDDVD 18, a movement range in the focusing directions necessary for the movable portion will be described with reference to FIG. 8.

In FIG. 8, a range S1 represents the movement range in the focusing directions necessary to the movable portion when a recording or a regeneration is executed in the BD 15; a range S2 represents the movement range in the focusing directions necessary to the movable portion when a recording or a regeneration is executed in the CD 16; a range S3 represents the movement range in the focusing directions necessary to the movable portion when a recording or a regeneration is executed in the DVD 17; and a range S4 represents the movement range in the focusing directions necessary to the movable portion when a recording or a regeneration is executed in the HDDVD 18. Then, a range St represents the total movement range in the focusing directions necessary to the movable portion. In other words, even when a recording or a regeneration is executed in any optical disk, the part of the movable body in the closest position to the disk moves within this range St. These movement ranges S1, S2, S3, S4, St all represent the ranges where the part of the movable body in the closest position to the disk can move.

Where the centers of the movement ranges S1, S2, S3, S4 should be positioned is determined based on the above described D1, D2, D3, D4, respectively. Specifically, the center position of the movement range S1 for the BD 15 is set to be the distance D1 away from the disk surface of the BD 15. Then, the center position of the movement range S2 for the CD 16 is set to be the distance D2 away from the disk surface of the CD 16. And, the center position of the movement range S3 for the DVD 17 is set to be the distance D3 away from the disk surface of the DVD 17. Then, the center position of the movement range S4 for the HDDVD 18 is set to be the distance D4 away from the disk surface of the HDDVD 18.

Herein, the movement range of the movable portion necessary to each optical disk is set by estimating the amount of the disk surface deflection and a mechanical error such as an assembly error. Hence, the movement range can be set as given below.

Movement range $S1$=(the unit's mechanical error)+ (the BD 15's surface deflection amount)

Movement range $S2$=(the unit's mechanical error)+ (the CD 16's surface deflection amount)

Movement range $S3$=(the unit's mechanical error)+ (the DVD 17's surface deflection amount)

Movement range $S4$=(the unit's mechanical error)+ (the HDDVD 18's surface deflection amount)

Herein, in terms of such a mechanical error, since the objective lens actuator is embedded in a singe optical disk unit and a singe optical head unit, which ever optical disk may be used, its value is the same. In contrast, the surface deflection amount varies according to the type of an optical disk. Specifically, the surface deflection amount of the BD 15, the DVD 17 and the HDDVD 18 is permitted to be 0.3 mm at the maximum in their standard, while the surface deflection amount of the CD 16 is permitted to be 0.5 mm at the maximum in its standard. In terms of the CD 16, many are also put on the market whose surface deflection amount are approximately 0.7 mm beyond the standard value. In the case of the CD 16, therefore, it is necessary to estimate a surface deflection amount value greater than that of the BD 15, the DVD 17 and the HDDVD 18. Accordingly, preferably, the required movement range of the movable portion in the focusing directions should be, $S1=S3 \approx S4 < S2$.

It is preferable that the movement range of the movable portion for the CD 16 be wider than the movement range for the other three kinds of disks. If the difference between the movement range S2 and the movement ranges S1, S3, S4 is calculated using the above described surface deflection amount, $S2-S1=(1.0 \sim 1.4)-0.3 \times 2=0.4 \sim 0.8$ $S2-S3=(1.0 \sim 1.4)-0.3 \times 2=0.4 \sim 0.8$ $S2-S4=(1.0 \sim 1.4)-0.3 \times 2=0.4 \sim 0.8$.

On the other hand, the distance between the center position of the movement range S2 and the center position of the movement range S1 is equal to a difference Z1 between the distance D2 and the distance D1. Then, the distance between the center position of the movement range S2 and the center position of the movement range S3 is equal to a difference Z2 between the distance D3 and the distance D2. And, the distance between the center position of the movement range S2 and the center position of the movement range S4 is equal to a difference Z3 between the distance D4 and the distance D2. Therefore, $Z1=(S2-S1)/2=0.2 \sim 0.4$ $Z2=(S2-S3)/2=0.2 \sim 0.4$ $Z3=(S2-S4)/2=0.2 \sim 0.4$ $Z2 \approx Z3$.

In this case, within the movement range S2, the movement range S1, the movement range S3 and the movement range S4 are substantially included, thereby bringing the total movement range St to the minimum. Besides, the value of Z1 can be prevented from being excessively limited, thus maximizing the value of Z1 while meeting the condition for minimizing the movement range St.

In this second embodiment, as shown in FIG. 8, the center position of the movement range for each optical disk is set to satisfy D1<D2<D4≈D3. This makes it possible to set the value of D2 above 0.4 mm. As a result, with focused on a CD-R or a CD-RW, the movable portion can be prevented from contacting or colliding with the stack rib.

Furthermore, the center position of the movement range for the CD 16 which has the widest movement range with kept in focus is set in the middle of the center positions of the movement ranges for the three kinds of optical disks. Thereby, the four movement ranges overlap each other in a wider section. This helps restraining the movement range St required in total from being larger.

Therefore, the disadvantage can be resolved in that the movable portion comes into contact or collision with the CD 16, thereby making the focusing impossible so that a recording or a regeneration cannot be executed in the CD 16. This contributes to the realization of a compatible-type optical disk unit which can execute a recording and a regeneration for a plurality of optical disks whose recording densities are different from each other. At the same time, the objective lens actuator becomes thinner, thus helping thin such an optical disk unit.

Moreover, in this embodiment, the values of Z1, Z2 and Z3 are set within a range of 0.2 to 0.4 mm. Therefore, the overlapping section of the movement ranges can be practically set in line with the differences in the surface deflection amount. This makes it possible to narrow the total movement range St certainly.

Incidentally, the objective lens actuator may also be used for a regeneration-dedicated unit.

Herein, the summary of the second embodiment will be described below.

(6) As described so far, in this second embodiment, if a first high-density optical disk with kept in focus is compared with a CD with kept in focus, the movable body is farther away from the disk when the CD is kept in focus. Therefore, the recording and regeneration capability of the first high-density optical disk can be maintained, and simultaneously, when a recording or a regeneration is executed in the CD which has a stack rib, the movable body is less likely to contact or collide with the disk. Besides, the position of the movable body with respect to the CD which has a wide movement range with kept in focus is between the positions of the movable body with respect to the other three disks with kept in focus. This helps widen the overlapping section of these movement ranges.

Consequently, the entire movement range can be restrained from being wider, thus making the objective lens actuator thinner.

(7) The movable body includes a collision avoidance portion which has a part in a position closer to the optical disk than the first objective lens and the second objective lens are. When the light beam is concentrated and focused on the first high-density optical disk, the distance D1 is the distance from the disk surface up to this part; when the light beam is concentrated and focused on the CD, the distance D2 is the distance from the disk surface up to this part; when the light beam is concentrated and focused on the DVD, the distance D3 is the distance from the disk surface up to this part; and when the light beam is concentrated and focused on the second high-density optical disk, the distance D4 is the distance from the disk surface up to this part. Therefore, even if the disk has come into contact or collision with the collision avoidance portion, the disk can be prevented from contacting or colliding with the first or second objective lens. This makes it possible to keep those objective lenses from being damaged.

(8) The first objective lens has a numerical aperture of 0.85 and has the characteristic of converging a laser beam whose wavelength is 405 nm upon the recording surface of the first high-density optical disk. The second objective lens has a numerical aperture of 0.65 and has the characteristic of converging a laser beam whose wavelength is 405 nm upon the recording surface of the second high-density optical disk.

(9) The distance D2 is longer than 0.4 mm. As a result, in a state where the second objective lens is focused on a CD-R or a CD-RW, the movable body can be effectively prevented from contacting or colliding with the disk.

(10) The difference between the distance D2 and the distance D1, the difference between the distance D3 and the distance D2 and the difference between the distance D4 and the distance D2 are both 0.2 mm or above and 0.4 mm or below.

The surface deflection allowable standard value of a CD is 0.5 mm while the standard value of a DVD is 0.3 mm. On the other hand, some CDs which are actually put on the market have a surface deflection amount of 0.7 mm. Besides, in terms of the high-density optical disk, its surface deflection amount is probably set at 0.3 mm or below. Hence, in the case where the value of (D2−D1), the value of (D3−D2) and the value of (D4−D2) are each set within a range of 0.2 to 0.4 mm, even if the surface deflection amount is different in accordance with the type of a disk, the movable body is to be set in the position determined by taking such a difference into account. Therefore, according to this aspect, the movable body's movement range is set in response to the practical difference in the surface deflection amount. This helps effectively use the overlapping section of the movement range, and thus, effectively reduce the thickness of the objective lens actuator.

INDUSTRIAL APPLICABILITY

The present invention is useful for an objective lens actuator in which two objective lenses are mounted on a lens holder, aiming at realizing a compatible-type optical disk unit which is capable of executing a recording and a regeneration for a plurality of optical disks whose recording densities are different from each other.

This application is based on patent application No. 2005-375228 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An objective lens actuator which is mounted on an optical head that concentrates a light beam on an optical disk, comprising:

a movable body including a first objective lens used for concentrating the light beam on a recording surface of a high-density optical disk having a recording density higher than a DVD, a second objective lens used for concentrating the light beam on a recording surface of a CD or a DVD, and a lens holder holding both objective lenses;

a base; and a support member supporting the movable body on the base so that the movable body can move in a focusing direction and in a tracking direction, wherein: when a light beam is concentrated and focused on the high-density optical disk, D1 represents a distance between a disk surface and a part of the movable body in a closest position to the disk; when a light beam is concentrated and focused on the CD, D2 represents a distance between a disk surface and the part of the movable body in the closest position to the disk; when a light beam is concentrated and focused on the DVD, D3 represents a distance between a disk surface and the part of the movable body in the closest position to the disk; and the following relational expression (1) is satisfied, $$D1<D2<D3 \qquad (1).$$

2. The objective lens actuator according to claim 1, wherein:

the movable body includes a collision avoidance portion which has a part in a position closer to the optical disk than the first objective lens and the second objective lens are;

when a light beam is concentrated and focused on the high-density optical disk, the distance D1 is a distance from the disk surface up to this part;

when a light beam is concentrated and focused on the CD, the distance D2 is a distance from the disk surface up to this part; and when a light beam is concentrated and focused on the DVD, the distance D3 is a distance from the disk surface up to this part.

3. The objective lens actuator according to claim 1, wherein the first objective lens has a numerical aperture of 0.85 and has a characteristic of converging a laser beam whose wavelength is 405 nm upon the recording surface of the high-density optical disk.

4. The objective lens actuator according to claim 1, wherein the distance D2 is longer than 0.4 mm.

5. The objective lens actuator according to claim 1, wherein a difference between the distance D2 and the distance D1 and a difference between the distance D3 and the distance D2 are both 0.2 mm or above and 0.4 mm or below.

6. An objective lens actuator which is mounted on an optical head that concentrates a light beam on an optical disk, comprising:

a movable body including a first objective lens used for concentrating the light beam on a recording surface of a first high-density optical disk having a base-material thickness of substantially 0.1 mm and a recording density higher than a DVD, using a bluish-violet laser, a second objective lens used for concentrating the light beam on a recording surface of a CD, a recording surface of a DVD or a recording surface of a second high-density optical disk having a base-material thickness of substantially 0.6 mm and a recording density higher than a DVD, using a bluish-violet laser, and a lens holder holding both objective lenses;

a base; and a support member supporting the movable body on the base so that the movable body can move in a focusing direction and in a tracking direction, wherein: when a light beam is concentrated and focused on the first high-density optical disk, D1 represents a distance between a disk surface and a part of the movable body in a closest position to the disk; when a light beam is concentrated and focused on the CD, D2 represents a distance between a disk surface and the part of the movable body in the closest position to the disk; when a light beam is concentrated and focused on the DVD, D3 represents a distance between a disk surface and the part of the movable body in the closest position to the disk; when a light beam is concentrated and focused on the second high-density optical disk, D4 represents a distance between a disk surface and the part of the movable body in the closest position to the disk; and the following relational expression (2) is satisfied, $$D1<D2<D3\approx D4 \qquad (2).$$

7. The objective lens actuator according to claim 6, wherein:

the movable body includes a collision avoidance portion which has a part in a position closer to the optical disk than the first objective lens and the second objective lens are;

when a light beam is concentrated and focused on the first high-density optical disk, the distance D1 is a distance from the disk surface up to this part;

when a light beam is concentrated and focused on the CD, the distance D2 is a distance from the disk surface up to this part;

when a light beam is concentrated and focused on the DVD, the distance D3 is a distance from the disk surface up to this part; and when a light beam is concentrated and focused on the second high-density optical disk, the distance D4 is a distance from the disk surface up to this part.

8. The objective lens actuator according to claim 6, wherein the first objective lens has a numerical aperture of 0.85 and has a characteristic of converging a laser beam whose wavelength is 405 nm upon the recording surface of the first high-density optical disk, and the second objective lens has a numerical aperture of 0.65 and has a characteristic of converging a laser beam whose wavelength is 405 nm upon the recording surface of the second high-density optical disk.

9. The objective lens actuator according to claim 6, wherein the distance D2 is longer than 0.4 mm.

10. The objective lens actuator according to claim 6, wherein a difference between the distance D2 and the distance D1, a difference between the distance D3 and the distance D2 and a difference between the distance D4 and the distance D2 are all 0.2 mm or above and 0.4 mm or below.

* * * * *